United States Patent
Gu et al.

(10) Patent No.: US 11,560,451 B2
(45) Date of Patent: *Jan. 24, 2023

(54) POLYMER COMPOSITION FOR SELECTIVE SINTERING

(71) Applicant: SABIC GLOBAL TECHNOLOGIES B.V., Bergen op Zoom (NL)

(72) Inventors: Hao Gu, Bergen op Zoom (NL); Zahir Bashir, Riyadh (SA)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 179 days.

This patent is subject to a terminal disclaimer.

(21) Appl. No.: 16/772,353

(22) PCT Filed: Dec. 10, 2018

(86) PCT No.: PCT/EP2018/084175
§ 371 (c)(1),
(2) Date: Jun. 12, 2020

(87) PCT Pub. No.: WO2019/115455
PCT Pub. Date: Jun. 20, 2019

(65) Prior Publication Data
US 2021/0079158 A1 Mar. 18, 2021

(30) Foreign Application Priority Data

Dec. 15, 2017 (EP) .................................. 17207825

(51) Int. Cl.
*C08G 63/88* (2006.01)
*B33Y 10/00* (2015.01)
*B33Y 70/00* (2020.01)
*B29C 64/153* (2017.01)
*C08K 3/01* (2018.01)
*C08G 63/16* (2006.01)
*B29K 67/00* (2006.01)

(52) U.S. Cl.
CPC ............ *C08G 63/88* (2013.01); *B29C 64/153* (2017.08); *B33Y 10/00* (2014.12); *B33Y 70/00* (2014.12); *C08G 63/16* (2013.01); *C08K 3/01* (2018.01); *B29K 2067/003* (2013.01)

(58) Field of Classification Search
CPC ... C22C 38/001; C22C 38/002; C22C 38/005; C22C 38/02; C22C 38/06; C22C 38/42; C22C 38/44; C22C 38/46; C22C 38/48; C22C 38/50; C22C 38/58; C22C 38/60; B29C 64/153; B29K 2067/003; B33Y 10/00; B33Y 70/00; C08G 63/16; C08G 63/88; C08K 3/01

See application file for complete search history.

(56) References Cited

U.S. PATENT DOCUMENTS

| | | | | |
|---|---|---|---|---|
| 5,527,877 A | * | 6/1996 | Dickens, Jr ............ | B33Y 10/00 428/317.9 |
| 5,573,820 A | | 11/1996 | Harazoe et al. | |
| 6,110,411 A | | 8/2000 | Clausen et al. | |
| 8,834,777 B2 | | 9/2014 | Simon et al. | |
| 9,580,551 B2 | * | 2/2017 | Vanelli .................... | C08G 69/02 |
| 11,155,676 B2 | * | 10/2021 | Bashir .................... | B33Y 70/00 |
| 2004/0102539 A1 | * | 5/2004 | Monsheimer .......... | B33Y 70/00 522/2 |
| 2006/0223928 A1 | * | 10/2006 | Monsheimer ............ | C08K 3/32 524/416 |
| 2007/0126159 A1 | | 6/2007 | Simon et al. | |
| 2007/0183918 A1 | * | 8/2007 | Monsheimer .......... | B22F 10/20 419/53 |
| 2009/0017220 A1 | | 1/2009 | Muller et al. | |
| 2013/0177766 A1 | | 7/2013 | Grebe et al. | |
| 2014/0221566 A1 | | 8/2014 | Martinoni | |

(Continued)

FOREIGN PATENT DOCUMENTS

| | | | |
|---|---|---|---|
| EP | 1598386 A1 | 11/2005 | |
| WO | 9606881 A2 | 3/1996 | |

(Continued)

OTHER PUBLICATIONS

Schmidt et al "Optimized polybutylene terephthalate powders for selective laser beam melting", Chemical Engineering Science 156 (2016), pp. 1-10 (Year: 2016).*

Leonardo A. Baldenegro-Perez et al "Molecular Weight and Crystallization Temperature Effects on Poly(ethylene terephthalate) (PET) Homopolymers, an Isothermal Crystallization Analysis", Polymers 2014, 6, 583-600 (Year: 2014).*

Bilal Demirel et al "Crystallization Behavior of PET Materials", BAÜ Fen Bil. Enst. Dergisi Cilt 13(1) 26-35 (2011) (Year: 2011).*

(Continued)

*Primary Examiner* — Frances Tischler
*Assistant Examiner* — Gennadiy Mesh
(74) *Attorney, Agent, or Firm* — Cantor Colburn LLP

(57) ABSTRACT

A polymer composition for the production of shaped objects via selective sintering includes ≥70.0 wt % of poly(ethylene terephthalate), wherein ≥25.0 wt % and ≤90.0 wt % of the poly(ethylene terephthalate) has resulted from a selective sintering process as unsintered material. The polymer composition is a powder having a $D_{10}$ of ≥10 and ≤40 μm, a $D_{50}$ of ≥75 and ≤100 μm, and a $D_{90}$ of ≥160 and ≤200 μm. The polymer composition allows for the production of an article having a continuous use temperature of ≥100° C., and results in a low change of molecular weight during exposure to selective sintering powder processing temperatures. Further, the polymer composition allows for a significant reduction of the waste material generated during selective sintering as the unsintered material does not have to be disposed of as waste but may be used again.

13 Claims, No Drawings

(56) References Cited

U.S. PATENT DOCUMENTS

2015/0251353 A1 9/2015 Rodgers et al.
2016/0215092 A1* 7/2016 Vanelli .................. C08G 69/14
2019/0177473 A1 6/2019 Bashir et al.

FOREIGN PATENT DOCUMENTS

WO 2013090174 A1 6/2013
WO 2017220228 A1 12/2017

OTHER PUBLICATIONS

Manfred Schmid et al "Materials perspective of polymers for additive manufacturing with selective laser sintering", J. Mater. Res., vol. 29, No. 17, Sep. 14, 2014 (Year: 2014).*
W. Golther "Solid-State Polycondensation of Polyester Resins: Fundamentals and Industrial Production", Modern Polyesters: Chapter 5; Chemistry and Technology of Polyesters and Copolyesters. Edited by J. Scheirs and T. E. Long (Year: 2003).*
International Search Report for International Application No. PCT/EP2018/084175, International Filing Date Dec. 10, 2018, dated Feb. 15, 2019, 6 pages.
Written Opinion for International Application No. PCT/EP2018/084175, International Filing Date Dec. 10, 2018, dated Feb. 15, 2019, 7 pages.
Baldenegro-Perez et al. Molecular Weight and Crystallization Temperature Effects on Poly(ethylene terephthalate)(PET) Homopolymers, an Isothermal Crystallization Analysis, 2014, 6, 583-600 ISSN 2073-4360.
Chrissafis et al. "Thermal degradation mechanism of poly(ethylene) succinate) and poly(butylene succinate) Comparative Study", Thermochimica Acta 435 (2005) 142-150.
Dadbakhsh et al. "Effect of powder size and shape on the SLS processability and mechnical properties of a TPU elastomer." Sep. 2016 (Year: 2016) pp. 971-980.
Greiner et al."Slective laser sintering of polymer blends: Bulk properties and process behavior", Polymer Testing 64 (2017) 136-144.
Rieckmann et al. "Poly(Ethylene Terephthalate) Polymerization—Mechanism, Catalysis, Kinetics, Mass Transfer and Reactor Desgin", Modern Polyesters, 2003.
Wegner "New polymer material for the Laser Sintering process: polyproylene and others", Sep. 2016 (Year: 2016) pp. 1003-1012.

* cited by examiner

POLYMER COMPOSITION FOR SELECTIVE SINTERING

CROSS REFERENCE TO RELATED APPLICATIONS

This application is a National Stage application of PCT/EP2018/084175, filed Dec. 10, 2018, which claims the benefit of European Application No. 17207825.5, filed Dec. 15, 2017, both of which are incorporated by reference in their entirety herein.

The present invention relates to a polymer composition for selective sintering. The invention also relates to a process for producing shaped objects via selective sintering using a polymer composition according to the present invention. The invention further relates to shaped objects produced via selective sintering using a polymer composition according to the present invention.

Selective sintering is an emerging technology that allows for the production of complex three-dimensional objects. At present, one of the main fabrication techniques of such three-dimensional objects is via injection moulding. However, injection moulding involves the use of expensive moulds, as a result of which injection moulding is only an efficient fabrication technique when the amount of objects produced using the mould is sufficiently large. For the production of objects in smaller series, the production costs are too high. For that reason, there is a need for alternative fabrication techniques that avoid the need for using such expensive moulds.

One such alternative fabrication technique is 3D printing. 3D printing is an additive manufacturing method, allowing to fabricate articles without the use of such expensive moulds. Using computer aided design (CAD), a model of the object to be produced is stored. Using this CAD model, a computer may steer a printing device by means of which a material may be shaped into the desired object. 3D printing further may allow for the production of articles of such complex shapes that may not be possible via injection moulding.

The material used for 3D printing may for example be a thermoplastic material. In that case, the printing may be performed by subjecting a predefined portion of a thermoplastic material, for example a powdery thermoplastic material, to a source of irradiation ensuring the particular portion of the thermoplastic material to reach a condition where it sinters with a neighbouring portion of material. Irradiation may be done by exposing the thermoplastic material to electromagnetic radiation such as infrared or near-infrared radiation. Such irradiation may for example be done using radiation having a wavelength of $\geq 100$ nm and $\leq 100$ μm, preferably $\geq 500$ nm and $\leq 15$ μm, more preferably $\geq 700$ nm and $\leq 5$ μm. Such processes are known as selective sintering processes.

In such selective sintering processes, the irradiation may for example be done using an infrared or near-infrared curing lamp, infrared or near-infrared light emitting diodes, or a laser source. Such irradiation may for example be done using laser irradiation.

Selective sintering processes may for example include processes where only a selected fraction of the material is subjected to radiation; alternatively, selective sintering may be achieved by applying a layer of a radiation absorbing material onto the area of the thermoplastic material that is to be sintered, and subsequently subjecting the surface area of the thermoplastic material, including the area to which the radiation absorbing material is not applied, to an irradiation source. Such selective sintering processes include for example high speed sintering (HSS) processes.

Selective sintering processes where only a selected fraction of the material is subjected to radiation include for example processes where irradiation may for example be done using laser irradiation. One technique for laser irradiation sintering of a predefined portion of a material such as a thermoplastic material is selective laser sintering (SLS). In SLS, a powder such as a powdery thermoplastic is positioned on a bed, where a laser source irradiates those portions of the powdery thermoplastic on the bed as indicated by the CAD model, in that way melting the thermoplastic material in that area. The molten material may then adhere to the thermoplastic material of a lower positioned layer. This positioned lower layer may be a layer previously formed by the SLS process. In this way, the desired object may be produced layer by layer. The unsintered powder material may be removed, for example dusted off, and may be re-used in a subsequent SLS process.

Objects produced using selective sintering processes such as SLS processes may thus be produced cost-efficiently. However, not every thermoplastic material is suitable for production of objects via SLS. Frequently, problems such as curling of the objects, orange peel, undesirable surface roughness or fuming during the process occur.

For example, when amorphous polymers are used for production of objects via SLS processes, this may result in objects having an insufficient quality. This may be accounted for in that amorphous polymers do not have a sharp melting point, but instead soften over a wide temperature range, and often have a high viscosity. This may result in objects having an undesirably high porosity and rough surface. Furthermore, the individual particles may still be discernible. When a higher intensity of irradiation is used to overcome the high viscosity, this again may lead to charring, or conduction of heat such that material softens in areas that are not desired, as a result of which the shape of the object obtained would not reflect the desired shape to the desired resolution.

Highly crystalline polymers on the other hand tend to melt at a sharp melting point, absorbing the energy of the source of irradiation to melt crystallites without the being transferred to surrounding areas to an undesirably large degree. However, highly crystalline polymers tend to have such fast crystallisation rate that may result in shrinking and warpage of the objects that are formed. This may be overcome by a very gradual and slow cooling of the material after the irradiation; however, this then leads to an undesirable increase in the time required for the SLS process.

In the SLS processes according to the state of the art, polylaurolactam, also referred to as nylon-12, is commonly used as thermoplastic material. Nylon-12 however has the disadvantage that it has a low melting point of 175° C., which results in a limitation of the continuous use temperature of the shaped objects to below 100° C. For certain applications, the continuous use temperature needs to be higher than 100° C. It is further preferred that the material can withstand a temperature above 200° C. for a short time without losing its desired properties.

There is thus a need for development of a thermoplastic material suitable for selective sintering that may be used in the production of shaped objects requiring a continuous use temperature of $\geq 100°$ C. The continuous use temperature may for example in the case of amorphous thermoplastic polymers be defined by the glass transition temperature ($T_g$); alternatively, in the case of crystalline polymers, it may be defined as 30° C. below the peak melting temperature ($T_m$).

A further disadvantage of nylon-12 is that the material is vulnerable to change of properties due to temperature exposure. This leads to a limited ability to re-use the left-over material from the SLS process that has not been fused or sintered by the selective irradiation, but that nevertheless has been exposed to heat for prolonged periods during pre-heating, building and cooling stages. The exposure to the powder bed temperatures during SLS leads to a change of the weight average molecular weight $M_w$ of the nylon-12, which in turn negatively influences several material properties, including the melt viscosity.

Further, when using nylon-12, only a minor fraction of the powder that is introduced to the selective sintering process may be formed by a material that has already been subjected to such sintering process (i.e. only a minor amount of unsintered material from a previous build can be used). In the course of a selective sintering process, a powder bed is formed of material at certain elevated temperature but below the melting temperature of the material. As only a certain part of the powder material results as fused or sintered material to form a shaped object, a certain, often even significant, portion of the material remains in powder form. This powder, however, has been subjected to the thermal exposure in the powder bed. For thermoplastic powders of the art, such as nylon-12 powders, this temperature exposure leads to certain changes in the material as a result of which they become unsuitable to be re-used in a further selective sintering process, and thus may need to be discard of as waste materials, or at best may only be used as a minor fraction in a powder used for a further selective sintering process, where the major portion is made up of virgin material. This obviously leads to process inefficiencies, cost increase and the occurrence of an undesired waste stream.

A class of thermoplastic materials that are known to have a high melting point and a high continuous use temperature are certain thermoplastic polyesters, such as semi-aromatic thermoplastic polyesters. For example, US20140221566A1 described the use of poly(butylene terephthalate) (PBT), a specific type of thermoplastic polyester, in SLS processing. A disadvantage of PBT is its fast crystallisation rate, which may lead to curling of the obtained product and slow build rates.

Thermoplastic polyesters for use in SLS processing are also described in US20070126159A1. However, the polyesters disclosed in this publication, prepared by polycondensation of a di- or polyhydric aliphatic alcohol and an aliphatic dicarboxylic acid, do not have a desired high melting point, and thus do not have a desired continuous use temperature of ≥100° C.

The above thus clearly presents the need to provide a thermoplastic material having a continuous use temperature of ≥100° C., and showing a low change of molecular weight during exposure to SLS powder processing temperatures. Furthermore, it is desirable that the article produced via SLS is crystalline rather than amorphous. Particularly, it is desirable that the material can be utilised in a manner such that the quantity of waste material after the sintering process is reduced. Waste material may herein be understood as material that is not suitable for use in a selective sintering shaping process.

This has now been achieved according to the invention by a polymer composition for the production of shaped objects via selective sintering wherein the polymer composition comprises a thermoplastic polyester selected from poly(ethylene terephthalate), poly(ethylene naphthalate), poly(ethylene furanoate), poly(trimethylene terephthalate), poly(ethylene succinate), or poly(hydroxyl butyrate), wherein ≥10.0 wt % of the thermoplastic polyester has been subjected to a thermal treatment.

Such polymer composition allows for the production of an article having a continuous use temperature of ≥100° C., and results in a low change of molecular weight during exposure to selective sintering powder processing temperatures. Further, such polymer composition allows for a significant reduction of the waste material generated during selective sintering as the unsintered material does not have to be disposed of as waste but may be used again fully, or blended with virgin material of the polymer composition and re-used, in a further selective sintering process.

It is preferred that ≥25.0 wt %, preferably ≥50.0 wt %, even more preferably ≥75.0 wt %, even more preferably 100.0 wt % of the thermoplastic polyester, with regard to the total weight of the thermoplastic polyester in the polymer composition, has been subjected to a thermal treatment.

For example, ≥10.0 and ≤90.0 wt %, preferably ≥25.0 and ≤90.0 wt %, more preferably ≥25.0 ands ≤80.0 wt %, even more preferably ≥50.0 and ≤80.0 wt % of the thermoplastic polyester, with regard to the total weight of the thermoplastic polyester in the polymer composition, has been subjected to a thermal treatment. A polymer composition comprising such thermoplastic polyester is understood to have particularly desirable colour appearance. It is also understood that use of such thermoplastic polyester allows for the utilisation of material that has been subjected to heat treatment for a prolonged duration.

The use of such thermoplastic polyester that has been subjected to selective laser sintering in the polymer composition, in particular in such quantities, allows for a desirable reduction of the quantity of the polymer composition that has to be disposed of as unsintered material after a selective sintering process that is not further suitable for use in selective sintering shaping operations, but still results in a shaped object from selective sintering that has the desired material properties.

The thermal treatment may for example involve exposing the thermoplastic polyester to a temperature of more than 100° C. above the glass transition temperature $T_g$ and less than 10° C. below the peak melting temperature $T_{p,m}$, wherein $T_g$ is determined in accordance with ISO 11357-2 (2013) and $T_{p,m}$ in accordance with ISO 11357-3 (2011), first heating run, preferably to more than 125° C. above $T_g$ and less than 20° C. below $T_{p,m}$.

The thermal treatment may for example be the exposure of powder material to elevated powder bed temperatures during a selective sintering process. That elevated powder bed temperature may for example be temperature more than 100° C. above the glass transition temperature $T_g$ and less than 10° C. below the peak melting temperature $T_{p,m}$, preferably more than 125° C. above $T_g$ and less than 20° C. below $T_{p,m}$.

Preferably, the thermoplastic polyester that has been subjected to a thermal treatment is a thermoplastic polyester that has resulted from a selective sintering process as unsintered materials.

Where the thermoplastic polyester is a poly(ethylene terephthalate), the temperature for the thermal treatment may for example be ≥170° C. and ≤230° C., preferably ≥200° C. and ≤230° C. It is particularly preferable that the thermoplastic polyester is a poly(ethylene terephthalate), very particularly preferable a poly(ethylene terephthalate) homopolymer.

Preferably, the thermoplastic polyester that has been subjected to a thermal treatment is a thermoplastic polyester that has resulted from a selective sintering process as unsintered materials, wherein the powder bed temperature during the selective sintering process is a temperature of more than 100° C. above the glass transition temperature $T_g$ and less than 10° C. below the peak melting temperature $T_{p,m}$, preferably more than 125° C. above $T_g$ and less than 20° C. below $T_{p,m}$.

Particularly preferably, the thermoplastic polyester that has been subjected to a thermal treatment is a poly(ethylene terephthalate) that has resulted from a selective sintering process as unsintered material, wherein the powder bed temperature during the selective sintering process is a temperature of more than 100° C. above the glass transition temperature $T_g$ and less than 10° C. below the peak melting temperature $T_{p,m}$, preferably more than 125° C. above $T_g$ and less than 20° C. below $T_{p,m}$.

Further particularly preferably, the thermoplastic polyester that has been subjected to a thermal treatment is a poly(ethylene terephthalate) that has resulted from a selective sintering process as unsintered material, wherein the powder bed temperature during the selective sintering process is ≥170° C. and ≤230° C., preferably ≥200° C. and ≤230° C.

The thermal treatment may for example have a duration of ≥1 hour. Preferably, the thermal treatment has a duration of ≥2 hours, more preferably ≥5 hours, and could even be up to 4 days.

The degree of crystallinity of the thermoplastic polyester as determined according to the formula:

$$D = \frac{\Delta H_f}{\Delta H_{f,100}} * 100\%$$

wherein:
D=degree of crystallinity of the thermoplastic material (%);
$\Delta H_f$=enthalpy of fusion of the thermoplastic material as determined in accordance with ISO 11357-3 (2011);
$\Delta H_{f,100}$=enthalpy of fusion of the thermoplastic material in a 100% crystalline state;
is preferably ≥10.0%, more preferably ≥12.5%, even more preferably ≥15.0%, and particularly ≥40.0%.

It is preferred that the thermoplastic polyester has such degree of crystallinity. With objects produced using materials having such degree of crystallinity, the continuous use temperature may be understood to be related to the crystalline melt temperature, and thus desirably high, where in objects produced using amorphous materials the continuous use temperature may be understood to be limited to the glass transition temperature.

It is preferred that the polymer composition comprises ≥70.0 wt % of the thermoplastic polyester, with regard to the total weight of the polymer composition, more preferably ≥80.0 wt %, even more preferably ≥90.0 wt %, even more preferably ≥95.0 wt %.

It is particularly preferred that the polymer composition ≥70.0 wt % of the thermoplastic polyester, with regard to the total weight of the polymer composition, more preferably ≥80.0 wt %, even more preferably ≥90.0 wt %, even more preferably ≥95.0 wt %, wherein the thermoplastic material is a polyester selected from poly(ethylene terephthalate), poly(ethylene naphthalate), poly(ethylene furanoate), poly(trimethylene terephthalate), poly(ethylene succinate), or poly(hydroxyl butyrate).

It is further particularly preferred that the polymer composition comprises ≥70.0 wt % of the thermoplastic polyester, with regard to the total weight of the polymer composition, more preferably ≥80.0 wt %, even more preferably ≥90.0 wt %, even more preferably ≥95.0 wt %, wherein the thermoplastic material is a polyester being poly(ethylene terephthalate).

Further particularly, it is preferred that the polymer composition comprises ≥70.0 wt % of the thermoplastic polyester, with regard to the total weight of the polymer composition, more preferably ≥80.0 wt %, even more preferably ≥90.0 wt %, even more preferably ≥95.0 wt %, wherein the thermoplastic polyester is a polyester selected from poly(ethylene terephthalate), poly(ethylene naphthalate), poly(ethylene furanoate), poly(trimethylene terephthalate), poly(ethylene succinate), or poly(hydroxyl butyrate), and wherein ≥10.0 wt % of the thermoplastic polyester, with regard to the total weight of the thermoplastic polyester in the polymer composition, has been subjected to a selective sintering process.

Even further particularly, it is preferred that the polymer composition comprises ≥70.0 wt % of the thermoplastic polyester, with regard to the total weight of the polymer composition, more preferably ≥80.0 wt %, even more preferably ≥90.0 wt %, even more preferably ≥95.0 wt %, wherein the thermoplastic polyester is a poly(ethylene terephthalate), and wherein ≥10.0 wt %, preferably ≥25.0 wt %, more preferably ≥50.0 wt %, even more preferably ≥75.0 wt % of the thermoplastic polyester, with regard to the total weight of the thermoplastic material in the polymer composition, is a thermoplastic polyester that has resulted from a selective sintering process as unsintered material.

It is preferred that the polymer composition is a powder having a mean particle volume size of ≥10 and ≤300 µm as determined in accordance with ISO 9276-2 (2014); more preferably ≥50 and ≤250 µm, or ≥100 and ≤200 µm. Such powder is particularly suitable for processing via SLS sintering, allowing for production of objects having low porosity. It is further preferred that the polymer composition is a powder having a $D_{10}$ of ≥5 and ≤50 µm, a $D_{50}$ of ≥60 and ≤150 µm, and a $D_{90}$ of ≥160 and ≤300 µm as determined in accordance with ISO 9276-2 (2014); more preferably, the powder has a $D_{10}$ of ≥10 and ≤40 µm, a $D_{50}$ of ≥75 and ≤100 µm, and a $D_{90}$ of ≥160 and ≤200 µm. A polymer composition having such particle size distribution is particularly suitable for processing via SLS because it allows for a good flow of materials during the filling of the powder bed, combined with good shape stability of the powder bed. Furthermore, it the particles are too big, the sintering of the material upon exposure to SLS would be insufficient. If particles are too fine, difficulties may occur in the formation of powder layers over the build area may become difficult.

A particularly preferable embodiment of the invention relates to a polymer composition comprising ≥70.0 wt % of the thermoplastic material, with regard to the total weight of the polymer composition, more preferably ≥80.0 wt %, even more preferably ≥90.0 wt %, even more preferably ≥95.0 wt %, wherein the thermoplastic material is a polyester being poly(ethylene terephthalate), and wherein ≥10.0 wt %, preferably ≥25.0 wt %, even more preferably ≥50.0 wt % of the thermoplastic polyester, with regard to the total weight of the thermoplastic polyester in the polymer composition, is a thermoplastic polyester that has resulted from a selective sintering process as unsintered material, wherein the polymer composition is a powder having a mean particle volume size of ≥10 and ≤300 µm, as determined in accordance with ISO 9276-2 (2014).

The change of molecular weight may for example be determined via gel permeation chromatography, for example according to ISO 16014-1 (2012), thereby obtaining parameters such as the weight average molecular weight ($M_w$) and the number average molecular weight ($M_n$). Alternatively, the change in molecular weight may be determined by dilute solution viscometry, for example according to ASTM D2857-95 (2007), thereby obtaining the intrinsic viscosity (IV). The change of molecular weight may be expressed as the difference in $M_w$, $M_n$ and/or IV determined on the polymer composition before and after exposure to SLS powder bed temperatures.

The DSC curve of the polymer composition preferably is obtained at a rate of heating and cooling of 10° C./min. In a preferred way of determination, the sample is first heated to obtain a melt peak via DSC, wherein with increasing temperature first the melt onset temperature, then the melt peak temperature, and then the melt end temperature according to the definition of ISO 11357-1 (2009) are obtained; during the subsequent cooling, first the crystallisation end temperature, then the crystallisation peak temperature and then the crystallisation onset temperature according to the definition of ISO 11357-1 (2009) are obtained.

Further, the thermoplastic polyester may for example have a glass transition temperature $T_g$ of ≥50° C. as determined in accordance with ISO 11357-2 (2013), preferably ≥60° C., more preferably ≥70° C.

The thermoplastic polyester may for example have a peak melt temperature $T_{p,m}$ of ≥200° C. as determined in accordance with ISO 11357-3 (2011), first heating run, preferably ≥220° C., more preferably ≥240° C.

Where a poly(ethylene terephthalate) is used in the polymer composition according to the present invention, it is preferred that the poly(ethylene terephthalate) has an intrinsic viscosity of ≥0.80 dl/g, more preferable ≥1.00 dl/g, even preferable ≥1.10 dl/g. It is also preferred that the poly(ethylene terephthalate) has an intrinsic viscosity of ≤2.50 dl/g, further preferable ≤2.00 dl/g, more preferable ≤1.50 dl/g. For example, the poly(ethylene terephthalate) may have an intrinsic viscosity of ≥0.80 dl/g and ≤2.50 dl/g, alternatively ≥1.00 dl/g and ≤1.50 dl/g.

The intrinsic viscosity (IV) is determined in accordance with ASTM D2857-95 (2007).

Poly(ethylene terephthlates) having such intrinsic viscosity may show a good combination of melt flow and strength of the sintered object after the laser irradiation, and may result in objects having desirable dimensional accuracy.

Particularly desirable is the use of a poly(ethylene terephthalate) having an intrinsic viscosity of ≥0.80 dl/g and ≤2.50 dl/g and a degree of crystallinity of ≥15.0%, preferably ≥40.0%. Such poly(ethylene terephthalate) shows a very desirable resistance to molecular weight changes under prolonged thermal treatment, and hence are most suitable to be re-used in selective sintering processes when obtained as unsintered material from such processes.

Further particularly desirable is the use of a polyethylene having a heat of fusion of ≥50 J/g.

The polymer composition according to the present invention may for example comprise a poly(ethylene terephthalate). For example, the polymer composition may comprise ≥80.0 wt %, alternatively ≥90 wt %, alternatively ≥95.0 wt % of a poly(ethylene terephthalate) with regard to the total weight of the polymer composition. The poly(ethylene terephthalate) may be a homopolymer or copolymer. In case the poly(ethylene terephthalate) is a copolymer, the poly(ethylene terephthalate) may for example comprise ≤15.0 wt %, alternatively ≤10.0 wt %, alternatively ≤5.0 wt %, alternatively ≤2.0 wt %, of units derived from a comonomer, with regard to the total weight of the poly(ethylene terephthalate).

Preferably, the poly(ethylene terephthalate) comprises ≥0.1 wt % and ≤10.0 wt %, alternatively ≥0.5 wt % and ≤5.0 wt % of units derived from a comonomer, with regard to the total weight of the poly(ethylene terephthalate). The units derived from a comonomer may for example be units derived from an aliphatic diol other than ethanediol. The units derived from a comonomer may for example be units derived from an aromatic dicarboxylic acid other than terephthalic acid. For example, the aromatic dicarboxylic acid other than terephthalic acid may be isophthalic acid. It is preferred that where the poly(ethylene terephthalate) is a copolymer, it comprises ≥0.5 wt % and ≤5.0 wt % of units derived from isophthalic acid, with regard to the total weight of the poly(ethylene terephthalate).

In a preferred embodiment of the invention, the poly(ethylene terephthalate) has an intrinsic viscosity of ≥1.00 dl/g and ≤1.50 dl/g.

The polymer composition may in certain embodiments further comprise a flow agent. For example, the polymer composition may comprise ≥0.01 wt % and ≤5.00 wt % with regard to the total weight of the polymer composition of a flow agent. Alternatively, the polymer composition may comprise ≥0.05 and ≤3.00 wt %, alternatively ≥0.10 and ≤1.50 wt, or a flow agent, based on the total weight of the polymer composition. The flow agent may for example be selected from silica, alumina, phosphate, borate, titania, talc, mica, kaolin, attapulgite, calcium silicate, magnesium silicate or a combination thereof. For example, the polymer composition may comprise ≥0.01 wt % and ≤5.00 wt % with regard to the total weight of the polymer composition of a flow agent selected from silica, alumina, phosphate, borate, titania, talc, mica, kaolin, attapulgite, calcium silicate, magnesium silicate or a combination thereof.

In a further embodiment, the present invention also relates to a process for production of shaped objects using the polymer composition according to the invention, wherein the process comprises the steps of:
(a) providing a quantity of a powder comprising the polymer composition;
(b) irradiating a portion of the polymer composition with an irradiation source such that the particles in that portion of the polymer composition absorb sufficient heat to reach a temperature above $T_{p,m}$;
(c) terminating the exposure of the portion of the polymer composition to the irradiation source so that the temperature of the particles of the polymer composition decreases to below $T_{p,m}$; and
(d) removal of the portion of the polymer composition that has not been sintered by the irradiation by the energy source; wherein steps (a) through (d) are executed in this sequence.

In another further embodiment, the present invention also relates to a process for production of shaped objects using the polymer composition according to the invention, wherein the process comprises the steps of:
(a) providing a quantity of a powder comprising the polymer composition;
(b) irradiating a portion of the polymer composition with an irradiation source such that the particles in that portion of the polymer composition absorb sufficient heat to reach a temperature above $T_{p,m}$;
(c) terminating the exposure of the portion of the polymer composition to the irradiation source so that the temperature of the particles of the polymer composition decreases to below $T_{p,m}$; and (d) removal of the portion of the polymer composition that has not been sintered by the irradiation by the energy source;
wherein steps (a) through (d) are executed in this sequence;
wherein the portion of the polymer composition removed in step (d) is further used in the polymer composition used in a further shaping process according to the steps (a)-(d).

In yet another further embodiment, the present invention also relates to a process for production of shaped objects using the polymer composition according to the invention, wherein the process comprises the steps of:
(a) providing a quantity of a powder comprising the polymer composition wherein a fraction of the polymer composition has previously been subjected to selective sintering;
(b) irradiating a portion of the polymer composition with an irradiation source such that the particles in that portion of the polymer composition absorb sufficient heat to reach a temperature above $T_{p,m}$;
(c) terminating the exposure of the portion of the polymer composition to the irradiation source so that the temperature of the particles of the polymer composition decreases to below $T_{p,m}$; and
(d) removal of the portion of the polymer composition that has not been sintered by the irradiation by the energy source;
wherein steps (a) through (d) are executed in this sequence.

Preferably, the polymer composition provided above under (a) comprises ≥10.0 wt % of a thermoplastic polyester that has resulted from a selective sintering process as unsintered material.

In a preferred embodiment,
step (a) comprises placing a quantity of powder comprising the polymer composition in a powder bed comprising a horizontal surface and a frame for holding the powder positioned on the surface;
step (b) comprises irradiating the portion of the polymer composition by a moving irradiation source; and
steps (a), (b) and (c) are repeated in this order to form stacked layers of the polymer composition sintered onto each other prior to execution of step (d).

Particularly, the present invention also relates to a process for production of shaped objects using the polymer composition according to the invention, wherein the process comprises the steps of:
(a) providing a quantity of a powder comprising the polymer composition;
(b) irradiating a portion of the polymer composition with a laser energy beam such that the particles in that portion of the polymer composition absorb sufficient heat to reach a temperature above $T_{p,m}$;
(c) terminating the exposure of the portion of the polymer composition to the irradiation of the laser energy beam so that the temperature of the particles of the polymer composition decreases to below $T_{p,m}$; and
(d) removal of the portion of the polymer composition that has not been sintered by the irradiation by the energy source;
wherein steps (a) through (d) are executed in this sequence.

In a preferred embodiment,
step (a) comprises placing a quantity of powder comprising the polymer composition in a powder bed comprising a horizontal surface and a frame for holding the powder positioned on the surface;
step (b) comprises irradiating the portion of the polymer composition by a moving laser energy beam; and
steps (a), (b) and (c) are repeated in this order to form stacked layers of the polymer composition sintered onto each other prior to execution of step (d).

It is preferred that the process is performed in an atmosphere comprising ≤1.0 wt % of oxygen.

The thermoplastic materials in the powder bed that is subjected to irradiation are commonly pre-heated to a temperature such that the irradiation energy and time needed to soften the material for sintering is minimized, whilst the material remains in a condition that the powder particles that are not subjected to irradiation do not sinter. If the powder bed temperature is too high, it may lead to sintering of the thermoplastic material in undesired locations, resulting in amongst others dimensional inaccuracy of the shaped object. If the powder bed temperature is too low, the thermoplastic material may insufficiently sinter in the desired locations, which may result in amongst others undesired porosity of the shaped object. For example, the powder bed temperature may be kept ≤60° C., more preferable ≤40° C., even more preferable ≥10 and ≤60° C. or ≥20 and ≤40° C., below $T_{p,m}$.

In the process according to the present invention, further additives may be applied that may contribute to the selective sintering process. For example, coalescing agents may be added. Such coalescing agents may for example comprise agents that enhance the absorption of the electromagnetic radiation and the conversion of the absorbed energy into thermal energy, thus contributing to the sintering process.

In further embodiments, the invention relates to shaped objects produced via the process according to the present invention, preferably wherein the shaped object has a porosity of ≤5.0%. More preferably, the shaped object has a porosity of ≤4.0%, alternatively ≤3.0%. The porosity may be determined by comparing the density of an article of the same composition and the same crystallinity produced using the material via SLS ($\rho_{SLS}$) with the density of an article produced via injection moulding ($\rho_{IM}$). The porosity (P) in % may for example be calculated as:

$$P = \frac{\rho_{IM} - \rho_{SLS}}{\rho_{IM}} * 100\%$$

The invention will now be illustrated by the following non-limiting examples.

A poly(ethylene terephthalate) (PET) homopolymer powder was used having the following properties:
an intrinsic viscosity (IV) of 1.12 dl/g as determined in accordance with ASTM D2857-95;
particle size distribution as determined in accordance with ISO 9276-2 (2014): $D_{10}$=39 μm; $D_{50}$=94 μm; $D_{90}$=188 μm; and mean particle volume size=107 μm;
weight average molecular weight ($M_w$) of 117.1 kg/mol and number average molecular weight ($M_n$) of 44.8 kg/mol, as determined in accordance with ISO 16014-1 (2012), and a polydispersity index $M_w/M_n$ of 2.62

The PET was a virgin PET, which is to be understood that the PET has not been subjected to any thermal treatment (such as in a selective sintering machine) after the production of the PET.

The PET powder material was divided into 5 sample portions, which were each subjected to a thermal treatment according to table I below. The thermal treatment simulates the level exposure to heat, both as conducted heat and as radiation heating from e.g. infrared lamps) to which material that is not sintered during a selective sintering process is exposed.

TABLE I

Thermal treatment conditions and molecular weights for PET powders

| Sample | A | B | C | D | E |
|---|---|---|---|---|---|
| Thermal treatment time | None | 24 h | 48 h | 72 h | 96 h |
| $M_w$ (kg/mol) | 117.1 | 113.9 | 118.8 | 125.5 | 130.0 |
| $M_n$ (kg/mol) | 44.8 | 44.2 | 46.3 | 47.3 | 49.1 |
| $M_w/M_n$ | 2.62 | 2.58 | 2.56 | 2.65 | 2.65 |

The thermal treatment was performed using an oven is which the powder samples were placed under vacuum at a temperature of 210° C. for a time period at indicated above in table I. The $M_w$ and $M_n$ of the samples were each determined after the thermal treatment.

Sample A can be understood to be a comparative example. It can be observed that the molecular structure as defined by $M_w$, $M_n$ and the $M_w/M_n$ ratio changes but does so only to a very limited extent. The numerical differences are within the variation of the GPC measurement method (±12%), and hence one can conclude that there is no statistically significant difference. Surprisingly, and unlike other polymer powders for SLS, the thermally treated material of samples B through E are still of such quality that they can be utilized as sinterable material in a selective sintering process, even without addition of virgin PET powder.

The thermally treated samples B-E, which may also be referred to as the aged powder samples, and comparative sample A, were subjected to differential scanning calorimetry (DSC) in accordance with ISO 11357-1 (2009). A first melting curve and a first cooling curve were recorded at a heating and cooling rate of 10° C./min, in nitrogen atmosphere. From the DSC curves, the extrapolated melt onset temperature of first heating ($T_{ei,m}$) in ° C. the peak melt temperature at first heating ($T_{p,m}$) in ° C., the heat of fusion in J/g, the extrapolated crystallisation onset temperature of first heating ($T_{ei,c}$) in ° C., the peak crystallisation temperature ($T_{p,c}$) in ° C., the heat of crystallisation in J/g, and the sintering window in ° C. were determined. The sintering window was calculated as $T_{ei,m}-T_{ei,c}$. Results are presented in table II.

TABLE II

DSC results

| Sample | A | B | C | D | E |
|---|---|---|---|---|---|
| $T_{ei, m}$ | 238 | 238 | 239 | 238 | 239 |
| $T_{p, m}$ | 242 | 242 | 242 | 242 | 242 |
| Heat of fusion | 57.0 | 59.7 | 60.5 | 61.2 | 61.4 |
| $T_{ei, c}$ | 186 | 186 | 185 | 185 | 184 |
| $T_{p, c}$ | 175 | 176 | 175 | 173 | 173 |
| Heat of crystallisation | 28.5 | 28.8 | 26.8 | 28.5 | 27.1 |
| Sintering window | 52 | 52 | 54 | 53 | 55 |

From the results in table II, it can further be concluded that the suitability of the samples B-E for use in selective sintering processes is not significantly affected by the thermal treatment. For example, the sintering window even increases, indicating that the temperature range to which the material is exposed during the sintering process even becomes less critical.

To further determine the properties of the sample materials and their suitability for utilisation in selective sintering processes resulting in objects having desired properties, a quantity of sample A and a quantity of sample E, i.e. the material that has undergone the severest thermal treatment, were each subjected to selective laser sintering to produce test bars of 2 cm width, 5 cm length and 3 mm thickness.

The selective laser sintering (SLS) was performed using an SLS machine comprising a $CO_2$ laser source. To each of the powder sample A and E, a quantity of 0.05 wt % Aerosil flow promoter was added. The materials were pre-dried prior to processing via SLS. The SLS process was conducted in an atmosphere having an oxygen content of ≤1.0 wt %. The SLS process conditions are presented in table III.

TABLE III

SLS process conditions.

| | |
|---|---|
| Powder bed temperature (° C.) | 228 |
| Piston temperature (° C.) | 180 |
| Cylinder temperature (° C.) | 175 |
| Feed temperature (° C.) | 160 |
| Laser power (W) | 30 |
| Scan speed (m/s) | 5 |
| Hatch distance (μm) | 100 |
| Layer thickness (μm) | 100 |

The produced bars were subjected to determination of density and the colour in the form of the yellowness index of the bars. Density in kg/m³ was determined in accordance with ASTM D792 (2013) according to method A; yellowness index (YI) was determined in accordance with ASTM E313 (2010). Results are presented in table IV.

TABLE IV

Results of testing of SLS bars

| Test bar | 1 | 2 | 3 |
|---|---|---|---|
| Material used for printing | 100 wt % of sample A | Powder blend of 80 wt % sample C, 20 wt % sample A | 100 wt % of sample E |
| Density | 1.362 | 1.369 | 1.366 |
| YI | 0.23 | | −1.21 |

These results present the density of the printed bars to be relatively unaffected by the use of either a virgin material or a material comprising thermally treated material.

With regard to the yellowness index, the results show that the YI of the bar produced using the thermally treated material is even better than that of the bar produced using virgin material, indicating that use of such thermally treated material leads to a desirable colour of the produced object.

The invention claimed is:

1. A polymer composition for the production of shaped objects via selective sintering wherein the polymer composition comprises ≥70.0 wt % of a thermoplastic polyester, wherein ≥25.0 wt % and ≤90.0 wt % of the thermoplastic polyester has been subjected to a thermal treatment, and the thermoplastic polyester that has been subjected to a thermal treatment is a thermoplastic polyester that has resulted from a selective sintering process as unsintered material,
wherein the thermoplastic polyester is poly(ethylene terephthalate) having an intrinsic viscosity of ≥0.80 dl/g and ≤2.5 dl/g determined in accordance with ASTM D2857-95 (2007), a degree of crystallinity of ≥15.0%, and a heat of fusion of ≥50 J/g, and wherein the polymer composition is a powder having a $D_{10}$ of $\geq 10$ and $\leq 40$ μm, a $D_{50}$ of $\geq 75$ and $\leq 100$ μm, and a $D_{90}$ of $\geq 160$ and $\leq 200$ μm.

2. The polymer composition according to claim 1, wherein the thermal treatment involves exposing the poly (ethylene terephthalate) to a temperature of more than 100° C. above the glass transition temperature $T_g$ and less than 10° C. below the peak melting temperature $T_{p,m}$, wherein $T_g$ is determined in accordance with ISO 11357-2 (2013) and $T_{p,m}$ is determined in accordance with ISO 11357-3 (2011), first heating run.

3. The polymer composition according to claim 1, wherein the thermal treatment is performed for $\geq 1$ hour.

4. The polymer composition according to claim 1 wherein the thermal treatment involves exposing the poly(ethylene terephthalate) to a temperature of $\geq 170°$ C. and $\leq 230°$ C.

5. The polymer composition according to claim 1, wherein $\geq 75.0$ wt % of the poly(ethylene terephthalate) has been subjected to the thermal treatment.

6. The polymer composition according to claim 1, wherein the poly(ethylene terephthalate) is a poly(ethylene terephthalate) homopolymer.

7. The polymer composition according to claim 1, wherein the poly(ethylene terephthalate) has an intrinsic viscosity of $\geq 1.00$ dl/g and $\leq 1.50$ dl/g determined in accordance with ASTM D2857-95 (2007).

8. The polymer composition according to claim 1, wherein the polymer composition comprises $\geq 90.0$ wt % of the poly(ethylene terephthalate) with regard to the total weight of the polymer composition.

9. The polymer composition according to claim 1, wherein the polymer composition further comprises $\geq 0.01$ wt % and $\leq 5.00$ wt % with regard to the total weight of the polymer composition of a flow agent selected from silica, alumina, phosphate, borate, titania, talc, mica, kaolin, attapulgite, calcium silicate, magnesium silicate or a combination thereof.

10. A process for the production of shaped objects using a polymer composition of claim 1,
wherein the process comprises the steps of:
(a) providing a quantity of a powder comprising the polymer composition of claim 1;
(b) irradiating a portion of the polymer composition with a radiation source, such that the particles in that portion of the polymer composition absorb sufficient heat to reach a temperature above the peak melting temperature $T_{p,m}$ determined via differential scanning calorimetry, first heating run in accordance with ISO 11357-1 (2009);
(c) terminating the exposure of the portion of the polymer composition to the irradiation source so that the temperature of the particles of the polymer composition decreases to below $T_{p,m}$; and
(d) removing the portion of the polymer composition that has not been subjected to irradiation by the energy source;
wherein steps (a) through (d) are executed in this sequence.

11. A shaped object produced from the composition of claim 1 by selective sintering process, wherein the shaped object has a porosity of $\leq 5.0\%$.

12. The polymer composition of claim 1, wherein $\geq 50.0$ wt % and $\leq 90.0$ wt % of the poly(ethylene terephthalate) has been subjected to a thermal treatment.

13. The polymer composition of claim 1, wherein $\geq 50.0$ wt % and $\leq 80.0$ wt % of the poly(ethylene terephthalate) has been subjected to a thermal treatment.

* * * * *